(12) United States Patent
Gupta

(10) Patent No.: US 10,937,301 B2
(45) Date of Patent: Mar. 2, 2021

(54) POWER CHECK AND SHORT TESTING INDICTOR FOR A POWER SUPPLY

(71) Applicant: Vinay Gupta, New York, NY (US)

(72) Inventor: Vinay Gupta, New York, NY (US)

(73) Assignee: OhnKat Inc., Shrewsbury, NJ (US)

( * ) Notice: Subject to any disclaimer, the term of this patent is extended or adjusted under 35 U.S.C. 154(b) by 0 days.

(21) Appl. No.: 16/704,891

(22) Filed: Dec. 5, 2019

(65) Prior Publication Data
US 2020/0134989 A1 Apr. 30, 2020

Related U.S. Application Data

(60) Provisional application No. 62/752,101, filed on Oct. 29, 2018.

(51) Int. Cl.
| | | |
|---|---|---|
| *G08B 29/04* | (2006.01) | |
| *H04N 7/18* | (2006.01) | |
| *G08B 5/36* | (2006.01) | |
| *G08B 3/10* | (2006.01) | |
| *G08B 21/18* | (2006.01) | |
| *H05B 45/10* | (2020.01) | |
| *H05B 45/30* | (2020.01) | |
| *H02M 7/00* | (2006.01) | |

(52) U.S. Cl.
CPC ............... *G08B 29/04* (2013.01); *G08B 3/10* (2013.01); *G08B 5/36* (2013.01); *G08B 21/182* (2013.01); *G08B 21/185* (2013.01); *H02M 7/003* (2013.01); *H04N 7/186* (2013.01); *H05B 45/10* (2020.01); *H05B 45/30* (2020.01)

(58) Field of Classification Search
CPC . G08B 29/04; G08B 3/10; G08B 5/36; G08B 21/185; G08B 21/182; H05B 45/10; H05B 45/30; H02M 7/003; H02M 7/06; H04N 7/186
USPC .......................................................... 340/538
See application file for complete search history.

(56) References Cited

U.S. PATENT DOCUMENTS

| | | |
|---|---|---|
| 5,962,932 A | 10/1999 | Matlo |
| 7,428,648 B2 | 9/2008 | Mulcahy et al. |
| 8,558,710 B1 | 10/2013 | Nitz |
| 2013/0088894 A1* | 4/2013 | Rozman ................... H02M 1/32 363/15 |
| 2020/0195127 A1* | 6/2020 | Garbossa ................. H02M 1/32 |

* cited by examiner

*Primary Examiner* — Ojiako K Nwugo
(74) *Attorney, Agent, or Firm* — Kirk A. Buhler; Buhler & Associates Patenting

(57) ABSTRACT

Improvements in a circuit with a glanceable indicator(s) for power checking and short testing in electrical power supplies is disclosed. Providing a reliable, easily understandable indication of electrical integrity will save consumers time and money by allowing them to quickly and accurately determine whether a power supply is causing an issue or lack of function with their powered device. By eliminating (or identifying) the power supply as the cause of the issue, the consumer will be able to troubleshoot quicker and have a better experience with their devices.

20 Claims, 2 Drawing Sheets

POWER CHECK AND SHORT TESTING INDICTOR FOR A POWER SUPPLY

CROSS REFERENCE TO RELATED APPLICATION

This application claims the benefit of Provisional Application Ser. No. 62/776,967 filed Dec. 7, 2018 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in status indicator for a power supply. More particularly, the present invention provides a circuit with a glanceable indicator(s) for power checking and short testing in electrical power supplies.

Description of Related Art Including Information Disclosed Under 37 CFR 1.97 and 1.98

Power supplies are designed with very basic features and at most tell the user whether they are energized or not (receiving power or not), but do not provide a means to check if they are functioning correctly from end to end at their full current capacity. Power supplies including plug in transformers are ubiquitous in homes and businesses powering all manner of electrical devices. Most power supplies and low-voltage transformers, however, only indicate proper function through the proper function of the device they are powering. When a power supply is used in an electrical setup, its role is to supply power to the connected load. When a user cannot easily assess if the power supply is functioning properly, they may discard the entire electrical setup or at least the power supply without being able to first identify the issue they are experiencing. Some power supplies provide an indicator light that has two stages, "on" and "off", and is not able to provide self-test ability to check if electrical power can reliably flow through the device to the delivery endpoints or if there is a short in the system.

Proper diagnoses of an electrical issue with the transformer requires a voltmeter or multimeter and other electrical accessories, which most consumers do not own nor understand how to use. In diagnosing a problem with the powered device, it is first important to eliminate the transformer or power supply as the problem variable. Providing a reliable, easy to understand indication of electrical integrity will save consumers time and money by allowing them to quickly and accurately determine whether a power supply is causing an issue or lack of function with their powered device. By eliminating (or identifying) the power supply as the cause of the issue, the consumer will be able to troubleshoot quicker and have a better experience with their devices.

The claimed invention differs from and is an improvement on what currently exists. Currently, no power supplies provide a multistage indicator to identify power issues such as a short or substandard power output without the use of a voltmeter or multimeter through to the delivery endpoints. This limits the ability of consumers to diagnose issues with their powered devices.

A number of patents and or publications have been made to address these issues. Exemplary examples of patents and or publication that try to address this/these problem(s) are identified and discussed below.

U.S. Pat. No. 5,962,932 issued on Oct. 5, 1999 to Darryl Matlo and is titled Power Supply Apparatus with Circuit Load Sensor. This patent discloses a power supply apparatus with circuit load sensor provides an extension cord having first and second ends extending from an enclosure. Within the enclosure, a power supply indicator circuit lights an LED in response to the plug of the extension cord being inserted into a live outlet. Also, within the enclosure, a power consumption indicator circuit lights an LED in response to consumption of power by a load plugged into the socket of the extension cord. While this provides an indicator for power and load it does not detect an overload/short or variably respond to it, nor does it operate with a power converter.

U.S. Pat. No. 7,428,648 issued on Sep. 23, 2008 to Luke Mulcahy et al., and is titled Power Supply Input Voltage Indicator. This patent discloses a circuit to indicate a match between a user-selectable power setting and an input voltage, comprises a first circuit node connected to a power source at an input voltage level, a second circuit node, a switch to switch the first circuit node and the second circuit node between a first position associated with a first voltage and a second position associated with a second voltage, and a first indicator coupled to the first circuit node and the second circuit node and activated when the switch is set in a position that corresponds to the input voltage level. This patent only identifies that power has been connected.

U.S. Pat. No. 8,558,710 issued on Oct. 15, 2013 to Steven M. Nitz and is titled Duplex Outlet with Current Indicator. This patent discloses an apparatus that enables indication of power utilization from an electrical outlet to be visually provided to a user, comprising receptacles, an illumination means, and a toggle switch. When an electrical power cord is plugged into the apparatus and is drawing any amount of current above zero (0) amps, the illumination means will activate, thereby alerting the user that the device is drawing power, even if the device is turned off, and allowing the user to take corrective action if necessary. The integral toggle switch deactivates the power to the device while leaving it plugged in. This patent only illuminates the LED when a device is drawing power from the outlet.

What is needed is a circuit that works with a power converter to allow a user to determine the status of power from the power converter by glancing at the indicator. The power check and short testing indictor for a power supply provides the solution.

BRIEF SUMMARY OF THE INVENTION

It is an object of the status indicator for a power supply for consumers to continuously check and self-test power reliability of electrical power supplies from the outlet to the endpoints of the attached electrical wiring. It quickly identifies issues present in the system while in use and can be used as a test mechanism to determine if the power supply can reliably provide power to the electrical endpoints where load is attached.

It is an object of the status indicator for a power supply to incorporate a circuit along with a multi-stage glanceable indicator into the transformer or power supply that accurately indicates the power supply's electrical state and will identify a short in the system if it exists. In addition, it provides for a means to manually test the integrity of the power supply through a forced short by the consumer that visibly demonstrates whether the power supply can provide the rated power output through the shorted endpoints. The consumer does not need any tools to execute the test as he or she needs only to touch the delivery endpoints.

It is another object of the status indicator for a power supply to provide a reliable, easily understandable indication of electrical integrity that will save consumers time and money by allowing them to quickly and accurately determine whether a power supply is causing an issue or lack of function with their powered device. By eliminating (or identifying) the power supply as the cause of the issue, the consumer will be able to troubleshoot quicker and have a better experience with their devices.

It is another object of the status indicator for a power supply to provide a status indicator for a power supply to be integrated into a power supply or transformer at the time of power supply's manufacture. Once installed, the invention will work automatically without any additional engagement by the consumer to indicate electrical problems in the system through the glanceable indicator. In the active test phase, the consumer would purposefully create a short feedback loop to change the phase state of the indicator. Upon release of the feedback loop, if the power supply and wire have full integrity, the indicator will return to the full-on state indicating full integrity and proper operation of the power supply.

It is still another object of the status indicator for a power supply to be useful for monitoring and testing any power supply or transformer. In any situation where quickly identifying an issue with a power supply, the wired system or the electrical flow would be useful, the invention provides, through its glanceable indicator, an easy understandable indicator. In addition, in critical situations (such as medical monitoring or security) where the integrity of the power supply is an important consideration, the invention will allow for quick, easy, and regular confirmation of integrity. Its primary consumers will be in markets where the integrity of the larger electrical grid is not in question. However, in markets and countries where electrical power is less reliable, the multi-stage indicator will provide value in indicating when voltage spikes or other reasons cause issues with electrical equipment.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
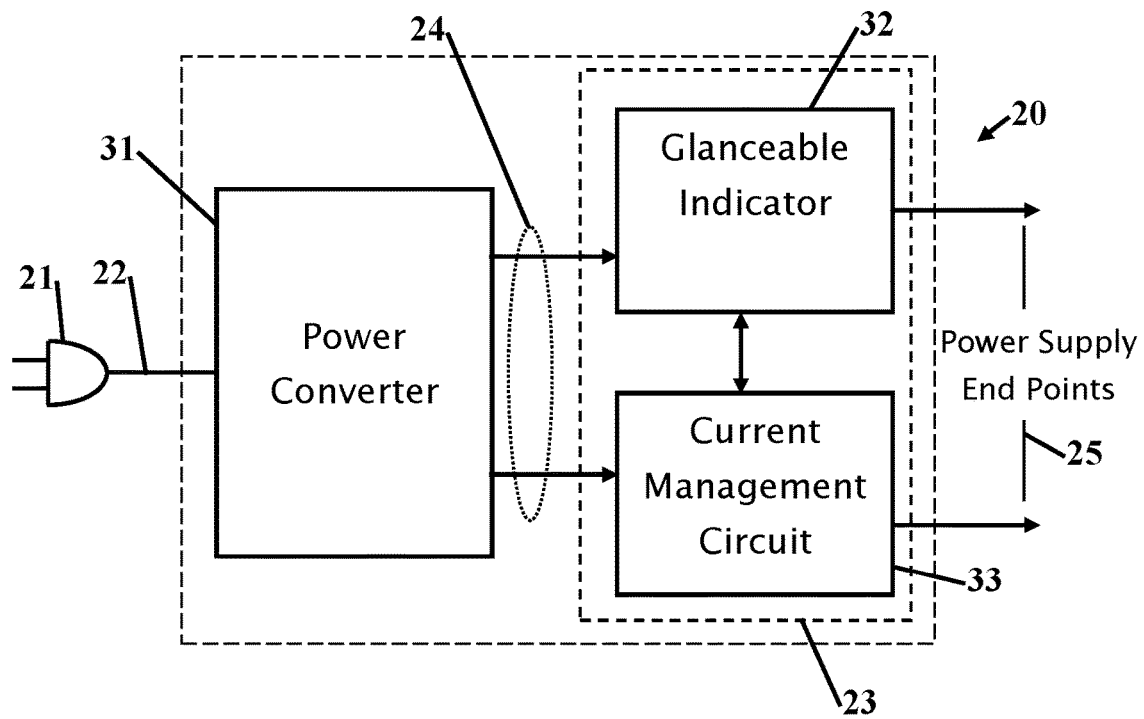
FIG. 1 shows a block diagram of the status indicator for a power supply.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

ITEM NUMBERS AND DESCRIPTION

| 20 | circuit with | 21 | Plug |
|---|---|---|---|
|    | power converter | 23 | circuit |
| 22 | connection to power | 25 | power supply |
| 24 | power from | | end points |
|    | power converter | 32 | glanceable indicator |
| 31 | power converter | 34 | LED |
| 33 | current management | 36 | resistor A |
| 35 | diode | 38 | positive temperature |
| 37 | resistor B | | coefficient resistor |
| 39 | resistor C | 40 | Off |
| 41 | powered | 42 | transition |

Figure 2:
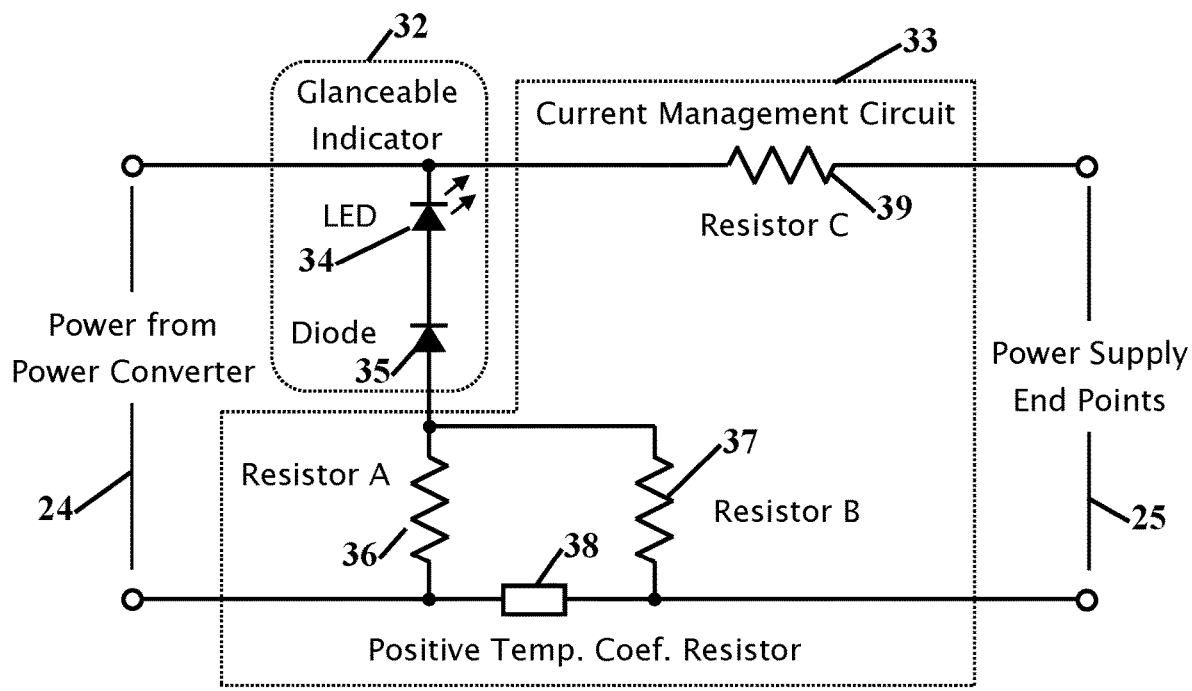
FIG. 2 shows a circuit diagram for the status indicator for a power supply.

Relationship Between the Components:

FIG. 1 shows a block diagram of the status indicator for a power supply with a power converter 31 with power from the power converter 24 and a circuit 23 that includes a glanceable indicator 32 and a current management circuit 33 and FIG. 2 shows a circuit diagram for the status indicator for a power supply. For a power supply, the power converter 31 will provide the rated voltage, current and power type as per the power supply specifications. The voltage and current are determined based upon the needs of the device or devices connected to the power supply end points 25.

In the preferred embodiment, a glanceable indicator 32 or a combination of light emitting diode 34 and blocking diode 35, or some other visual, acoustic or mechanical indicator or combination thereof, will provide cues as to the state of the power supply. The glanceable indicator 32 is connected to the power converter 31 and conveys the state of the power converter 31 through different indications.

The power converter 31 and the glanceable indicator 32 are electrically connected to an appropriately designed and sized current management 33 module. The current management 33 module provides the correct levels of electromotive force to the glanceable indicator 32 for activating it, and is a combination of different components; for example a large and a comparatively small resistor A 36 and B 37, respectively, are connected in parallel when the glanceable indicator 32 is an LED 34 (in the embodiment shown), with an optimally sized short circuit protection, which is a combination of a positive temperature coefficient 38 resistor and other electrical components and allows the power delivery side of the power supply end points 25 to be tested at and beyond the rated current without harm to the power supply. The resistance of resistor B 37 is much smaller than the resistance of resistor A 36, and this provides a much smaller equivalent resistance than just resistor A 36 to current flow, when resistor A 36 and resistor B 36 are in parallel. Shown is an example of such a current management 33 circuit with a positive temperature coefficient resistor 38 and current limiting high wattage resistor 39 in a preferred embodiment. The positive temperature coefficient resistor 38 can be a thermal fuse, but could also be a thermistor or similar device that changes resistance as it heats. This allows the LED to show variation in brightness as the power being supplied to the power supply end points 25 varies.

Operation

When the power supply is unenergized the glanceable indicator 32 shows its first state. In the example shown, the LED 34 is unlit. When the power supply is energized, current management 33 allows enough current to flow through the glanceable indicator 32 and the LED 34 is illuminated at a high intensity showing that the power supply is powered up.

This is another state of the glanceable indicator 32. When a load is connected to the power supply endpoints and working correctly, the glanceable indicator 32 stays in this state, indicating that the load is getting power from the power supply.

In a situation where the load connected to the power supply end points 25 is not working and the user needs to self-test the power supply, the user can remove the load and short the end points of the power supply end points 25 to each other. This action will cause a high current (only limited by the design of the current management 33) to flow through the power delivery side end points 25 of the power supply. This will trigger the short circuit protection in the current management 33 module and will cause the glanceable indicator 32 to transition to another distinct state (lit at very low intensity in case of LED 34), indicating by this transition that the power supply was able to send high current, at and beyond its rated capacity, through its endpoints. If the transition in glanceable indicator 32 does not happen, then there is an issue in the power supply and it is not capable of delivering appropriate power to its endpoints. If the transition happens, and the transition can be repeated by untouching and touching the endpoints of the power supply, then the power supply is working well. A resistor C 39 limits the amount of amount of current that can flow out of the upper power supply end point 25.

The short circuit protection in the current management 33 will also transition the glanceable indicator 32 when there is a short during normal operation somewhere in the system, including in the load being powered by the power supply. It will in such a situation disconnect the power delivery side from sending power. This state transition provides for safety where a prolonged short in the system including the load may not be a safe thing.

How the Status Indicator for a Power Supply Works:

The status indicator for a power supply combines a glanceable indicator or LED 34 with an electrical circuit for current management in conjunction with optimal short protection in a power supply or power converter 31. The power converter 31 is an electrical subsystem that takes the power from the input points or plug 21, that is connected to an electric socket, and then converts it into the power supply's delivery power. This subsystem could be one or a combination of a transformer, switch mode power supply and or other electrical component(s) that converts the power from a power source to different voltage that will power a device. The subsystem scales up or down the input voltage and translates its waveform for output use. The output of the power converter 31 module is mated to a glanceable indicator 32 and a current management 33 module. The glanceable indicator 32 conveys the state of the power supply through visual, acoustic or mechanical cues to the user. The current management 33 module serves the function of providing appropriate electromotive power to the glanceable indicator 32 and has a current protection circuit that allows for the power supply to be tested up to and slightly beyond its rated power output without harm.

Figure 3:
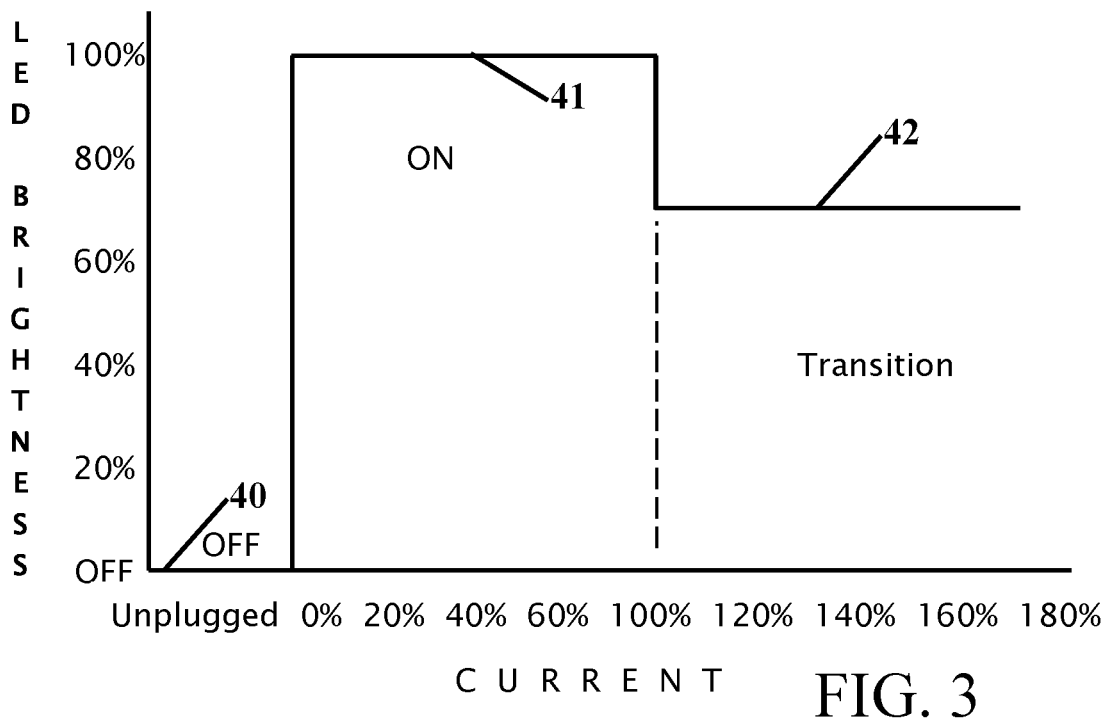
FIG. 3 shows a graph of the three different illumination states of the LED.

The LED 34 (as a potential glanceable indicator 32) works in conjunction with a current management 33 module that includes a positive temperature coefficient resistor 38. The LED 34 has three states, FIG. 3 shows a graph of the three different illumination states of the LED 34.

State 1—Indicates off 40

State 2—Indicates unit is powered 41

State 3—Intermediate transition state 42

State 3 when the power supply is in use indicates a short or electrical issue between the power supply and the endpoints. Transition to State 3, 42 when end points 25 are touched to each other and reversion back to State 2, 41 when they are disconnected indicates that power supply is correctly delivering power to the endpoints 25. The way the circuit works is that the full current flow when the end points 25 are shorted triggers the positive temperature coefficient resistor 38 which is optimally sized for such operation. Full short current flow through the circuit for a short duration also ensures that the electrical pathway is secure. The unit will work unimpeded in normal conditions, but if a short exists or when the current consumption exceeds 100% of the rated, or intended supply of current is exceeded in the line, the glanceable indicator 32 will enter Intermediate transition 42.

This allows for:

a. The glanceable indicator 32 conveys the state of the power supply; the glanceable indicator 32 is in State 1, 40 (e.g., dark or no LED brightness) when the power supply is passive and unused;

b. Plugging in the power supply causes the glanceable indicator 32 to move to State 2, 41 (e.g., full LED brightness) if the power supply is receiving power from the wall socket 21. In this state, the LED 34 is powered by current flowing through both resistor A 36 and resistor B 37;

c. When a user touches the power supply end points 25 together, or when the current being consumed is excessive, high-current will flow through the full electrical pathway made by the power converter 31 if it is functioning properly through to the power supply end points 25. After a short duration of time the positive temperature coefficient resistor 38 opens making the glanceable indicator 32 move to state 3 42. In this state, the LED 34 is powered by current flowing through only resistor A 36 because when the positive temperature coefficient resistor 38 opens current will no longer flow to resistor B, 37 and the lower power supply end point 25;

d. While the current is high 42 the short protection part of the circuit prevents damage to the power supply by opening the circuit after a safe, short period of time. The circuit is opened when the positive temperature coefficient resistor 38 opens the flow path to the power supply end points 25;

e. If there is a break-in the electrical pathway anywhere between the power supply and the touched endpoints, the high current will not flow through the power supply end points 25 and the glanceable indicator 32 will remain in State 2. In this state, the LED 34 is powered by current flowing through both resistor A 36 and resistor B 37 as the positive temperature coefficient resistor 38 remains in normal unopened state;

f. If the pathway is complete and uninterrupted, it will sustain the short duration high current, but the opening of the electrical pathway by the positive temperature coefficient resistor 38 will cause the glanceable indicator to move to State 3 (e.g., very dim but still illuminated). The level of illumination is 20 to 80% of full illumination in the State 3. It is also contemplated that the LED can flash in State 3. In this state, the LED 34 is powered by current flowing through only resistor A 36 because when the positive temperature coefficient resistor 38 opens current will no longer flow to resistor B, 37 and the lower power supply end point 25;

g. If the user separates the lead ends, or the over-current condition ends, the glanceable indicator 32 returns to State 2, 41. User can repeat steps b to f to see state transition, which indicates a properly functioning power supply. In this state, the LED 34 is powered by current flowing through both resistor A 36 and resistor B 37;

h. If the expected state changes do not occur through this process, there is an electrical issue with the power supply between the connection to power 22 ends and the power supply end points 25.

How to Make the Status Indicator for a Power Supply

Figure 4:
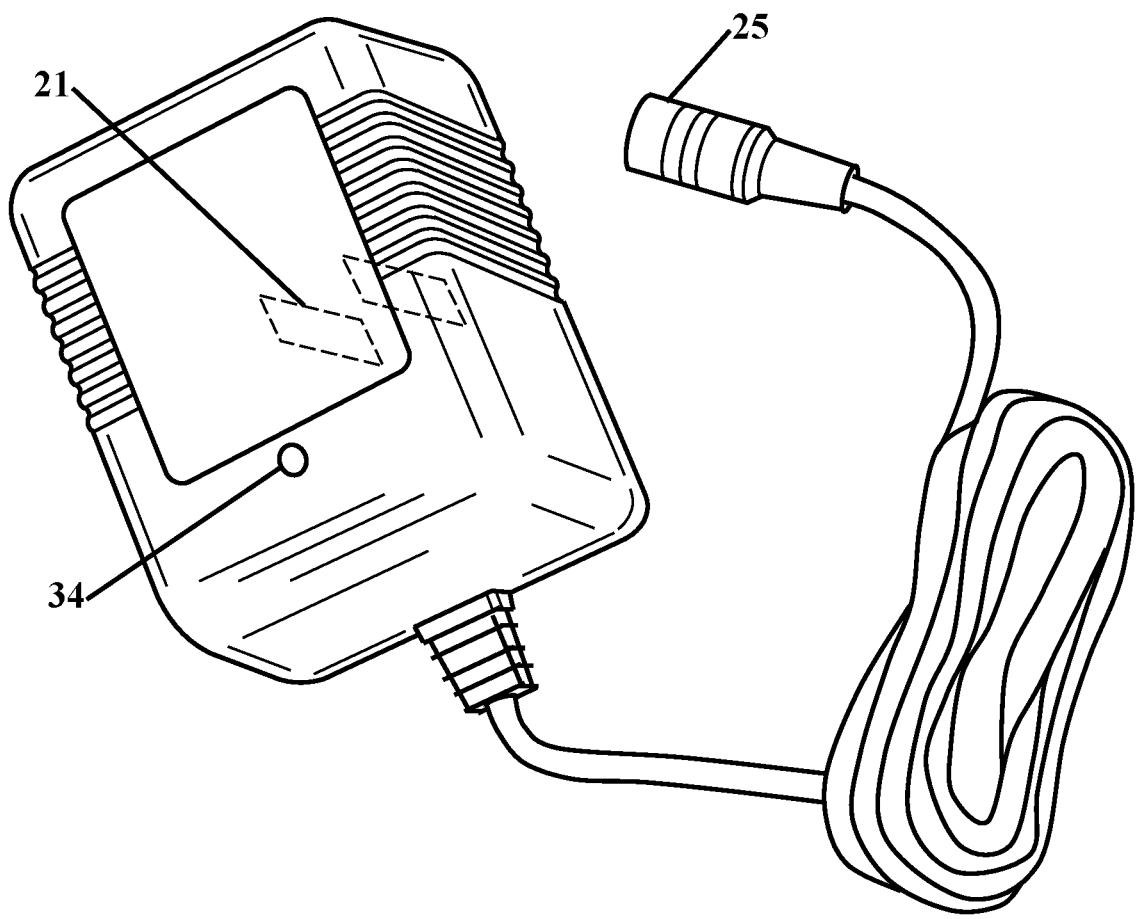
FIG. 4 shows a perspective view of a power supply with the status indicator.

FIG. 4 shows a perspective view of a power supply 20 with the status indicator LED 34. While a single-color LED 34 is shown, it is contemplated that the LED 34 could have more than one color. The components in the diagram are connected for full functionality. The sizing of the resistors and the positive temperature coefficient resistor 38 is based upon the operating voltage and the current demands of the device that is connected to the power supply end points 25.

The power converter 31 module can be any combination of suitable electrical components that can provide a suitable voltage conversion, current output and power type as per the power supply specifications. The glanceable indicator 32 can be any suitable indicator which can be set to various indications in an electrical circuit. For example: lights that change brightness, lights that change color, sounds that change volume, sounds that change tone, mechanical indicators etc. The current management 33 module can be any combination of electrical components that can suitably drive the glanceable indicator 32 to different indications, and also provide current limiting and short protection functions to allow for the power supply to be tested up to and beyond its rated capacity without harm.

The status indicator for a power supply provides an indication of different states of a power supply to allow any user without skilled expertise or access to testing devices to self-test a power supply through to its endpoints power supply end points 25. In the embodiment shown the end points 25 is a connector that allows for changing the pin type or connector so the end points can connect to different types of connectors or devices.

Thus, specific embodiments of a status indicator for a power supply have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A status indicator for a power supply comprising:
   an electrical connection to a power converter;
   an LED indicator electrically connected between said power converter and a pair of power supply end points;
   said LED indicator is connected to said power converter through a first resistor;
   said LED indicator is also connected to a second resistor through a positive temperature coefficient resistor;
   said power supply end points are connected to said LED indicator and to said second resistor, whereby
   said LED indicator provides at least three conditions of power being supplied to said power supply end points;
   said at least three conditions, namely no power to said electrical connection, power being supplied to said pair of power supply end points and a high current consumption condition at said pair of power supply end points.

2. The status indicator for a power supply according to claim 1, wherein said power converter is a transformer or a switching power supply that increases or decreases a voltage through said power converter.

3. The status indicator for a power supply according to claim 1, further includes a housing wherein said power converter and said indicator are integrated within said housing.

4. The status indicator for a power supply according to claim 3, wherein said housing further includes said electrical connection whereby said electrical connection is configured to suspend said housing from an electrical outlet.

5. The status indicator for a power supply according to claim 1, further includes an electrical cord connected between a plug and said housing.

6. The status indicator for a power supply according to claim 1, further includes a third resistor that is configured to limit current through said power converter.

7. The status indicator for a power supply according to claim 1, wherein said LED is illuminate between 20 and 80% of full illumination when said high current consumption condition is present.

8. The status indicator for a power supply according to claim 1, wherein said LED illuminates when said high current consumption condition is present.

9. The status indicator for a power supply according to claim 1, further includes a blocking diode connected to said indicator.

10. A status indicator for a power supply comprising: an electrical connection to a power converter; an indicator; said indicator is connected said power converter through a first resistor; said indicator is also connected to a second resistor through a positive temperature coefficient resistor; a power supply end point that is connected to said indicator and to said second resistor, whereby at least three conditions of power being supplied to said power supply end point are indicated by said indicator.

11. The status indicator for a power supply according to claim 10, wherein said power converter is a transformer or a switching power supply that increases or decreases a voltage through said power converter.

12. The status indicator for a power supply according to claim 10, further includes a housing wherein said power converter and said indicator are integrated within said housing.

13. The status indicator for a power supply according to claim 12, wherein said housing further includes said electrical connection whereby said electrical connection is configured to suspend said housing from an electrical outlet.

14. The status indicator for a power supply according to claim 10, further includes an electrical cord connected between a plug and said housing.

15. The status indicator for a power supply according to claim 10, further includes a third resistor that is configured to limit current through said power converter.

16. The status indicator for a power supply according to claim 10, wherein said indicator provides a visual, acoustical or mechanical indication.

17. The status indicator for a power supply according to claim 16, wherein said indicator is an LED.

18. The status indicator for a power supply according to claim 17, wherein said LED is illuminate between 20 and 80% of full illumination when said power supply end point are shorted.

19. The status indicator for a power supply according to claim 17, wherein said LED flashes when said power supply end point are shorted.

20. The status indicator for a power supply according to claim 10, further includes a blocking diode connected to said indicator.

\* \* \* \* \*